US009984337B2

United States Patent
Kadav et al.

(10) Patent No.: US 9,984,337 B2
(45) Date of Patent: May 29, 2018

(54) PARALLELIZED MACHINE LEARNING WITH DISTRIBUTED LOCKLESS TRAINING

(71) Applicant: NEC Laboratories America, Inc., Princeton, NJ (US)

(72) Inventors: Asim Kadav, Franklin Park, NJ (US); Erik Kruus, Hillsborough, NJ (US); Hao Li, Princeton, NJ (US)

(73) Assignee: NEC Corporation (JP)

( * ) Notice: Subject to any disclaimer, the term of this patent is extended or adjusted under 35 U.S.C. 154(b) by 298 days.

(21) Appl. No.: 14/872,521

(22) Filed: Oct. 1, 2015

(65) Prior Publication Data

US 2016/0103901 A1    Apr. 14, 2016

Related U.S. Application Data

(60) Provisional application No. 62/061,284, filed on Oct. 8, 2014, provisional application No. 62/144,648, filed on Apr. 8, 2015.

(51) Int. Cl.
*G06F 17/30* (2006.01)
*G06N 99/00* (2010.01)
*G06F 9/46* (2006.01)

(52) U.S. Cl.
CPC ............ *G06N 99/005* (2013.01); *G06F 9/46* (2013.01); *G06F 17/30174* (2013.01); *G06F 17/30209* (2013.01); *G06F 17/30578* (2013.01)

(58) Field of Classification Search
CPC ... G06N 99/005; G06F 9/46; G06F 17/30174; G06F 17/30209; G06F 17/30578
See application file for complete search history.

(56) References Cited

U.S. PATENT DOCUMENTS

2014/0189104 A1*  7/2014  Dalton ................ H04L 43/0876
                                                                    709/224
2015/0324690 A1*  11/2015  Chilimbi ................ G06N 3/063
                                                                    706/25

OTHER PUBLICATIONS

Wang et al. "A scalable and topology configurable protocol for distributed parameter synchronization," Proceedings of 5th Asia-Pacific Workshop on Systems, ACM, Jun. 2014.*
Hellerstein et al. "The MADlib analytics library: or MAD skills, the SQL," Proceedings of the VLDB Endowment 5.12 (2012): 1700-1711, Aug. 27-31, 2012.*
Jeff Dean et al., "Large Scale Distributed Deep Networks" NIPS (, 2012).
M. Zaharia et al., "Resilient distributed datasets: A fault-tolerant abstraction for in-memory cluster computing" USENIX NSDI (, 2012) https://www.usenix.org/system/files/conference/nsdi12/nsdi12-final138.pdf.

(Continued)

*Primary Examiner* — Jay A Morrison
(74) *Attorney, Agent, or Firm* — Joseph Kolodka

(57) ABSTRACT

Systems and methods are disclosed for providing distributed learning over a plurality of parallel machine network nodes by allocating a per-sender receive queue at every machine network node and performing distributed in-memory training; and training each unit replica and maintaining multiple copies of the unit replica being trained, wherein all unit replicas train, receive unit updates and merge in parallel in a peer-to-peer fashion, wherein each receiving machine network node merges updates at later point in time without interruption and wherein the propagating and synchronizing unit replica updates are lockless and asynchronous.

19 Claims, 3 Drawing Sheets

(56) References Cited

OTHER PUBLICATIONS

Mu Li et al., "Scaling Distributed Machine Learning with the Parameter Server" OSDI (, 2014) https://www.cs.cmu.edu/~dga/papers/osdi14-paper-li_mu.pdf.

J. Dean et al., "MapReduce: simplified data processing on large clusters" Communications of the ACM—50th anniversary issue: 1958-2008 (Jan. 2008).

Necoara, Ion et al., "Fast primal-dual projected linear iterations for distributed consensus in constrained convex optimization.," IEEE Decision and Control (CDC) (, 2010).

Recht, Ben et al., "Hogwild: A lock-free approach to parallelizing stochastic gradient descent" Advances in Neural Information Processing Systems. 2011, NIPS 2011 (, 2011).

McDonald Ryan et al., "Distributed Training Strategies for the Structured Perceptron" HLT '10 Human Language Technologies: The 2010 Annual Conference of the North American Chapter of the Association for Computational Linguistics (, 2010).

A. Agarwal et al., "Reliable Effective Terascale Linear Learning System" Journal of Machine Learning Research 15 (, 2014) http://arxiv.org/abs/1110.4198.

Dahl, George et al., "Parallelizing Neural Network Training for Cluster Systems" Proceedings of the IASTED International Conference on Parallel and Distributed Computing and Networks (pp. 220-225). ACTA Press. (, 2008).

\* cited by examiner

# PARALLELIZED MACHINE LEARNING WITH DISTRIBUTED LOCKLESS TRAINING

This application claims priority to Provision Applications 62/061,284 filed Oct. 8, 2014 and 62/144,648 filed Apr. 8, 2015, the contents of which are incorporated by reference.

BACKGROUND

The present invention relates to distributed lockless training

A machine learning model or unit is a set of weights (or parameters), over features. Applying a new input data to the machine learning model/unit, gives a prediction output to a classification or regression problem. Distributed machine learning involves training a machine-learning unit in parallel. This consists of a cluster of machines, each one training one or more unit replicas in parallel, with data being split across the replicas. Each replica trains on a subset of data and incrementally updates the machine-learning unit every iteration. In order to ensure that each unit is created from all data, each of these replicas communicates the unit parameter values to one-another. The replicas merge the incoming unit and continue training over local data.

A number of platforms have implemented distributed machine learning. For example, Map-Reduce/Hadoop platform communicates unit updates using the file system. Hadoop uses the map-reduce paradigm. The map step consists of all replicas creating a trained unit. In the reduce step, the parallel replicas, pick up the unit from the file system and apply to their unit. Since Hadoop communicates using the file system, the training speed is limited to disk performance. Another platform is Spark which is an in-memory data processing platform that stores objects in memory as immutable objects. The data is stored as distributed objects. Each worker trains on a set of data and updates the unit. Spark and Hadoop are based on the map-reduce paradigm and perform bulk-synchronous processing of creating a machine learning unit. This is because both Hadoop and Spark are deterministic and have explicit training, update and merge steps. Synchronous unit training is slow and with a large number of workers, it can be too slow to be practical.

A third paradigm, a dedicated parameter server collects all unit updates and sends out the unit-updates to all network nodes. In these systems, all parallel units send unit updates to a single server and receive the updated unit. Hence, the parameter server receives the units, updates them to create a new unit and sends it to all replicas. While this system can train in asynchronous fashion, it is not fully asynchronous, since it requires the workers to wait for an updated unit to arrive from the parameter server.

SUMMARY

Systems and methods are disclosed for providing distributed learning over a plurality of parallel machine network nodes by allocating a per-sender receive queue at every machine network node and performing distributed in-memory training; and training each unit replica and maintaining multiple copies of the unit replica being trained, wherein all unit replicas train, receive unit updates and merge in parallel in a peer-to-peer fashion, wherein each receiving machine network node merges updates at later point in time without interruption and wherein the propagating and synchronizing unit replica updates are lockless and asynchronous.

Advantages of the system may include one or more of the following. The system can synchronize the units across the parallel replicas such that the synchronization overhead is low. The system's distributed in-memory training allows propagating and synchronizing unit updates to be lockless and completely asynchronous. By using extra space at every sender for providing asynchronous training, the system can reduce the unit training time. Reducing model or unit training times leads to better units being produced at shorter intervals. The reduced training times also help in parameter tuning i.e. picking the right set of parameters to tune.

DESCRIPTION

Figure 1:
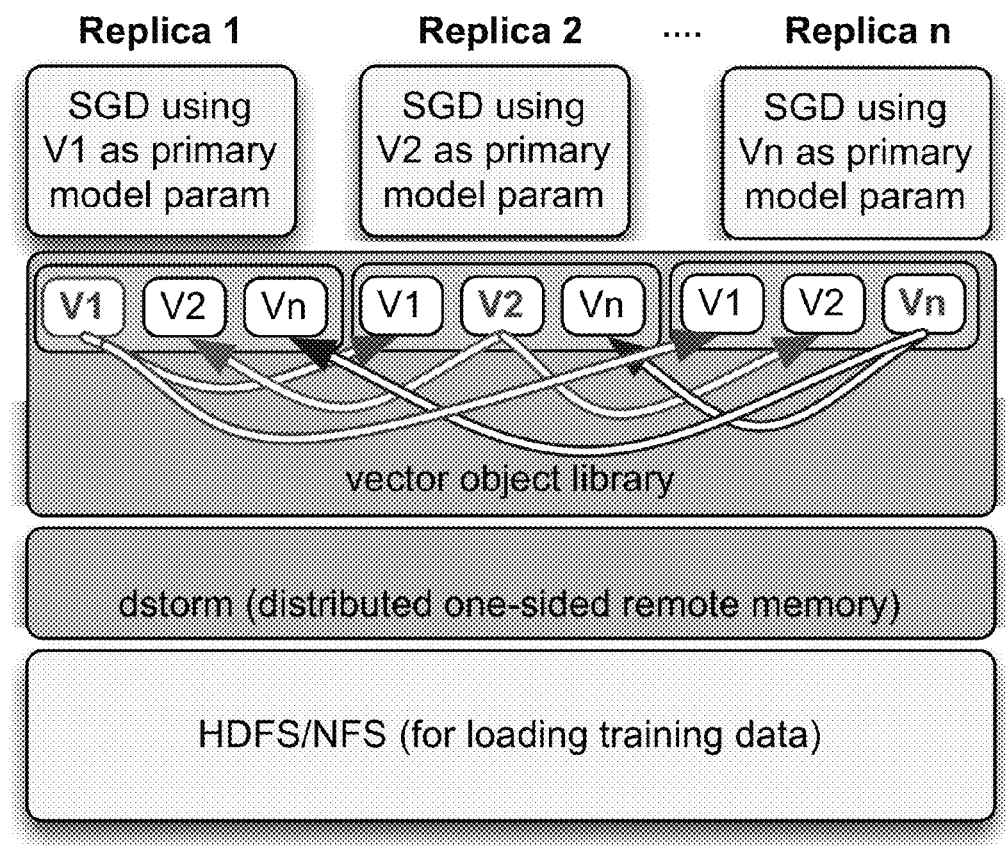
FIG. 1 shows exemplary MALT processing machines with data and unit/model parameters.

FIG. 1 shows processing machines with data and model/unit parameters in one embodiment called MALT. MALT provides a lockless in-memory learning solution. In MALT, instead of a single parameter server, all models or units train, receive the unit updates and merge in parallel in a peer-to-peer fashion. MALT allocates a per-sender receive queue at every network node/process training a unit replica and maintain multiple copies of the machine learning unit being trained. The receiver merges these updates at later point in time and is not interrupted. These machines train machine-learning units on data iteratively. Every iteration produces a unit update. These updates are propagated to all other machines that are training in parallel with portions of data from the same dataset. Each replica stores, per-sender unit (shown as V2, V3, . . . , Vn in V1; V1, . . . Vn in V2).

When parallel replicas train their units and send their updates, the incoming units are stored in these receive queues on every network node. At the end of every iteration (or every few iterations), each unit processes the incoming units and updates its current unit. As a result, unit replicas can train in parallel and send their updates to one another, in a fully asynchronous fashion. The replicas send their updates and proceed to the next iteration. The receiver is not interrupted either as it only looks up the queue at the end of its iteration cycle, and performs a merge of all received updates.

This approach can be extended using hardware support (such as RDMA) to further reduce receive side interruption. RDMA allows data to be directly sent to receiver's memory without interrupting receiver side CPU. When unit updates are propagated using RDMA, it allows for fully asynchronous unit training The receive side is not interrupted to merge its updates. The receive side CPU is not even interrupted to received the update and store it in a receive queue, since this operation is performed in hardware using RDMA.

Machine learning methods generalize from data. Machine learning methods train over data to create a unit representation that can predict outcomes (regression or classification) for new unseen data. More formally, given a training set $\{(x_1, y_1), (x_2, y_2), \ldots, (x_n, y_n)\}$, the goal of unit training is to determine the distribution function f such that $y=f(x, w)$. The input x may consist of different features and the unit consists of parameters w, representing the weights of individual features to compute y. The goal of unit training is to estimate the values of unit parameters w. During unit testing, this unit is tested using an unseen set of $x_t$ to compare against ground truth (already known $y_t$), to determine the unit accuracy. Thus, machine learning methods train to minimize the loss, which represents some function that evaluates the difference between estimated and true values for the test data.

Learning model/unit training methods are iterative, and the method starts with an initial guess of the unit parameters and learns incrementally over data, and refines the unit every iteration, to converge to a final acceptable value of the unit parameters. Unit training time can last from minutes to weeks and is often the most time-consuming aspect of the learning process. Unit training time also hurts unit refinement process since longer training times limit the number of times the unit configuration parameters (called hyper-parameters) can be tuned through re-execution.

Machine learning methods can benefit from a scale-out computing platform support in multiple ways: First, these methods train on large amounts of data, which improves unit accuracy. Second, they can train large units that have hundreds of billions of parameters or require large computation such as very large neural networks for large-scale image classification or genomic applications. Training with more data is done by data parallelism, which requires replicating the unit over different machines with each unit training over a portion of data. The replicas synchronize the unit parameters after a fixed number of iterations. Training large units requires the unit to be split across multiple machines, and is referred to as unit parallelism.

With datasets getting larger, there has been a recent focus to investigate online methods that can process data-sets incrementally such as the gradient descent family of methods. Gradient descent methods compute the gradient of a loss function over the entire set of training examples. This gradient is used to update unit parameters to minimize the loss function. Stochastic Gradient Descent (SGD) is a variant of the above method that trains over one single example at time. With each example, the parameter vector is updated until the loss function yields an acceptable (low) value. SGD and its variants are preferred methods to train over large data-sets because it can process large training datasets in batches. Furthermore, gradient descent can be used for a wide-range of methods such as regression, k-means, SVM, matrix-factorization and neural networks.

In data-parallel learning, unit replicas train over multiple machines. Each replica trains over a subset of data. There are several ways in which the individual unit parameters can be synchronized. We describe three such methods. First, units may train independently and synchronize parameters when all parallel units finish training by exhausting their training data. These methods are commonly used to train over Hadoop where communication costs are prohibitive. Also, while these units may train quickly because of limited communication between replicas, they may require more passes over training data (each pass over training data is called an epoch) for acceptable convergence. Furthermore, for non-convex problems, this method may not converge, since the parallel replicas may be trapped in a different local minima, and averaging these diverging units may return a unit with low accuracy.

The second method is the parameter server approach. Here, individual units send their updates to a central parameter server (or a group of parameter servers) and receive an updated unit from them. A third method is the peer-to-peer approach (used in MALT), where parameters from unit replicas train in parallel and are mixed every (or every few) iteration. The last two methods achieve good convergence, even when the parameters are communicated asynchronously. With MALT, we perform asynchronous parameter mixing with multiple parallel instances of unit replicas. This design allows developers to write code once, that runs everywhere on parallel replicas (no separate code for parameter server and client). This design also simplifies fault tolerance—a failed replica is removed from the parameter mixing step and its data is redistributed to other replicas. Finally, instead of performing simple gradient descent, MALT can be used to implement averaging of gradients from its peers, which provides speedup in convergence for certain workloads.

The system provides distributed machine learning over existing ML systems. MALT exposes an asynchronous parameter mixing API that can be integrated into existing ML applications to provide data-parallel learning. Furthermore, this API is general enough to incorporate different communication and representation choices as desired by the machine learning developer. MALT provides peer-to-peer learning by interleaving gradient (changes to parameters) updates with parameter values to limit network costs. In the next section, we describe MALT design.

Comparing with FIG. 1's exemplary MALT architecture, existing applications run with modified gradient descent methods that receive unit update (V) from replicas training on different data. Unit vectors are created using a Vector Object Library that allows creation of shared objects. Each replica scatters its unit update after every (or every few) iteration and gathers all received updates before the next iteration. Unit replicas train in parallel on different cores (or sets of cores) across different network nodes using existing ML libraries. ML libraries use the MALT vector library to create unit parameters or gradients (updates to parameters) that need to be synchronized across machines. These vectors communicate over DiSTributed One-sided Remote Memory or dstorm. Furthermore, like other data-parallel frameworks, MALT loads data in unit-replicas from a distributed filesystem such as NFS or HDFS. Developers use the MALT API to shard input data across replicas and send/receive gradients. Furthermore, developers can also specify the dataflow across replicas and make their methods fully asynchronous. We now describe the shared memory design, the MALT API that allows developers access to shared memory, fault tolerance and network communication mechanisms that allow developers to balance communication and computation.

Machine learning units train in parallel over sharded data and periodically share unit updates after few iterations. The parallel replicas may do so synchronously (referred to as the bulk-synchronous processing). However, this causes the training to proceed at the speed of the slowest machine in that iteration. Relaxing the synchronous requirement speeds up unit training but may affect the accuracy of the generated unit. Since unit weights are approximate, applications developers and researchers pick a point in this trade-off space (accuracy vs speed) depending on their application and system guarantees. Furthermore, this accuracy can be improved by training for multiple epochs or increasing the amount of data at for training each unit replica.

The original map-reduce design communicates results over GFS/HDFS. However, using disk for communication, results in poor performance especially for machine learning applications which may communicate as often as every iteration. Spark provides immutable objects (RDDs) for an efficient in-memory representation across machines. Spark provides fault tolerance using lineage of RDDs as they are transformed across operations. However, this enforces determinism in the order of operations. As a result, the immutability and determinism makes it less suitable for fine-grained, asynchronous operations. Furthermore, machine learning applications may contain multiple updates to large sparse matrices or may need to propagate unit updates asynchronously across machines and need first-class support for fine-grained and asynchronous operations.

MALT's design provides efficient mechanisms to transmit unit updates. There has been a recent trend of wide availability for cheap and fast infiniBand hardware and they are being explored for applications beyond HPC environments. RDMA over infiniBand allows low latency networking of the order of 1-3 micro-seconds by using user-space networking libraries and by re-implementing a portion of the network stack in hardware. Furthermore, the RDMA protocol does not interrupt the remote host CPU while accessing remote memory. RDMA is also available over Ethernet with the newer RDMA over Converged Ethernet (RoCE) NICs that have comparable performance to infiniBand. InfiniBand NICs are priced competitively with 10 G NICs, costing around $500 for 40 Gbps NICs and 800$ for 56 Gbps NICs (as of mid 2014). Finally, writes are faster than reads since they incur lower round-trip times. MALT uses one-sided RDMA writes to propagate unit updates across replicas.

We build dstorm (dstorm stands for DiSTributed One-sided Remote Memory) to facilitate efficient shared memory for ML workloads. In MALT, every machine can create shared memory abstractions called segments via a dstorm object. Each dstorm segment is created by supplying the object size and a directed dataflow graph. To facilitate one-sided writes, when a dstorm segment is created, the network nodes in the dataflow synchronously create dstorm segments. dstorm registers a portion of memory on every network node with the infiniBand interface to facilitate one-sided RDMA operations. When a dstorm segment is transmitted by the sender, it appears at all its receivers (as described by the dataflow), without interrupting any of the receiver's CPU. We call this operation as scatter. Hence, a dstorm segment allocates space (a receive queue) in multiples of the object size, for every sender in every machine to facilitate the scatter operation. We use per-sender receive queues to avoid invoking the receiver CPU for resolving any write-write conflicts arising from multiple incoming unit updates from different senders. Hence, our design uses extra space with the per-sender receive queues to facilitate lockless unit propagation using one-sided RDMA. Both these mechanisms, the one sided RDMA and per-sender receive queues ensure that the scatter operation does not invoke the receive-side CPUs.

Once the received objects arrive in local per-sender receive queues, they can be read with a local gather operation. The gather function uses a user-defined function (UDF), such as an average, to collect the incoming updates. We also use queues on the sender side, allowing senders to perform writes asynchronously. Additionally, the sender-side queues maintain a back-pressure in the network to avoid congestion.

The receiver does not know when its per-sender receive queues get filled unless the receiver is actively polling and consuming these items. When the receive queue is full, the default behavior of dstorm is to over-write previously sent items in the queue. We discuss the consistency behavior after we describe the vector abstraction to create shared vectors or tensors (multi-dimensional vectors) over the dstorm object.

We build a vector object library (VOL) over dstorm that allows creating vector objects over shared memory. The goal of VOL is to 1) expose a vector abstraction instead of shared memory abstraction (dstorm) and 2) to provide communication and representation optimizations. ML developers can specify gradients or parameters as a VOL vector (or tensor) and specify its representation (sparse or dense). They also specify a data flow graph describing how the updates should be propagated in the cluster which is used to create the underlying dstorm segment.

Hence, creating a vector in turn creates a dstorm segment that allows this vector to be propagated to all machines as described in the dataflow graph. This dataflow describes which machines may send updates to one another (in the simplest case, everyone may send their updates to everyone). Hence, an edge in the graph from network node A to network nodes B and C implies that when network node A pushes a unit update, it is received by network nodes B and network node C. As different machines compute unit updates, they scatter these updates to other remote network nodes without acquiring any locks or invoking any operations at the receiver. However, if a machine sends too many updates before the previous ones are consumed, the previous updates are over-written.

VOL inherits scatter and gather calls from dstorm to send the vector to remote machine and gather all the received updates (from local memory). Developers can also specify where to send the unit updates within scatter calls. This provides fine-grained access to data flow to the developers, allowing greater flexibility. Table 1 describes the VOL API. In Section 4, we describe how this API can be used to easily convert serial ML methods to data-parallel.

Consistency guarantees: We now describe the consistency guarantees that MALT provides when transmitting unit updates to other replicas. With machine learning applications, which are stochastic in nature, unit updates maybe be over-written or updated locklessly without affecting overall accuracy of the unit output significantly. For example, Hogwild demonstrates that asynchronous, lock-less unit updates lead to units that ultimately converge to acceptable accuracy. Hence, MALT need not provide strict consistency guarantees when sending unit updates over infiniBand (ex. as in key-value stores). However, since MALT is a general-purpose API, it provides mechanisms to deal with following inconsistency issues:

1. Torn reads: When a unit replica sends a unit update to another unit replica, the sender may overwrite the unit update while the receiver is reading it in the case where the replicas operate asynchronously and the receive queue is full. MALT provides an additional atomic gather which reads the shared memory in an atomic fashion.

2. Stale replicas: Unit updates carry an iteration count information in the header. When a receiver realizes that a specific unit update is arriving too slowly, the receiver may stall its operations until the sender catches up. This design is similar to the bounded-staleness approach explored by recent work.

If stricter guarantees are required, the unit replicas can train synchronously in bulk-synchronous fashion and use the barrier construct to do so. The barrier construct is a conventional barrier which waits for all unit replicas to arrive at a specific point in the training process.

MALT has a straightforward unit for fault tolerance. The training data is present on all machines in a distributed file system. The unit replicas train in parallel and perform one-sided writes to all peers in the communication. A fault monitor on every network node examines the return values of asynchronous writes to sender-side queues. If the fault monitor observes failed writes, it performs a synchronous health check of the cluster with other monitors on other network nodes. A network node is considered dead if the network node is corrupt (the shared memory or the queue has failed) and the remote fault monitor reports this, or if the network node is unreachable by any of the other healthy network node's fault monitor. Furthermore, to detect the failure cases that do not result in a machine or a process crash, local fault monitors can detect processor exceptions such as divide by zero, stack corruption, invalid instructions and segmentation faults and terminate the local training process.

In case of a failure, the working fault monitors create a group of survivor network nodes to ensure that all future group operations such as barrier, skip the failed network nodes. The RDMA interface is re-registered (with old memory descriptors) and the queues are re-built. This is to avoid a zombie situation where a dead network node may come back and attempt to write to one of the previously registered queues. Finally, the send and receive lists of all unit replicas are rebuilt to skip the failed network nodes and the training is resumed. Since the send and receive lists are rebuilt, it is possible to re-run any MALT configuration on a smaller number of network nodes. If there is a network partition, training resumes on both clusters independently. However, it is possible to halt the training if the partition results in a cluster with very few network nodes.

After recovery, if an acceptable loss value is not achieved, the training continues on the survivor replicas with additional training examples until the units converge. This causes a slowdown in the training process proportional to the missing machines apart from a short delay to synchronize and perform recovery (of the order of seconds). MALT only provides fail-stop fault tolerance, i.e. it can only handles failures where a fault monitor detects corruption or is unresponsive because of the MALT process being killed or a machine failure or a network failure. MALT cannot handle Byzantine failures such as when a machine sends corrupt gradients or software corruption of scalar values that cannot be detected by local fault monitors. MALT can afford a simple fault tolerance unit because it only provides data parallelism and does not split the unit across multiple machines. Furthermore, the unit training is stochastic and does not depend on whether the training examples are processed in a specific order, or the training examples are processed more than once, or whether all the training examples have been processed, as long as the unit achieves an acceptable accuracy. Furthermore, MALT implements peer-to-peer learning and does not have a central master. As a result, it does not need complex protocols like Paxos to recover from master failures.

Figure 2:
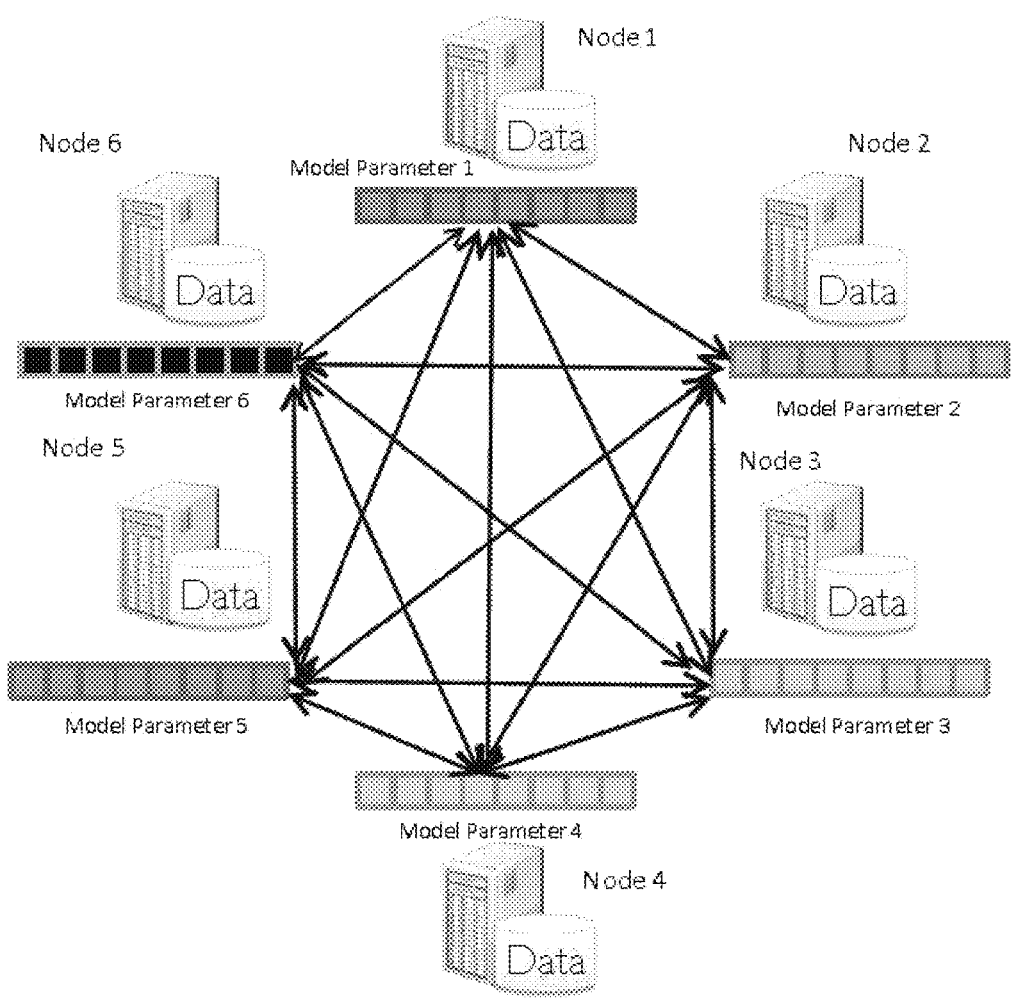
FIG. 2 shows an exemplary All-reduce exchange of unit updates.

FIG. 2 shows an exemplary All-reduce exchange of unit updates. All arrows indicate bi-directional communication. As number of network nodes (N) grow, total number of updates transmitted increases $O(N^2)$.

Figure 3:
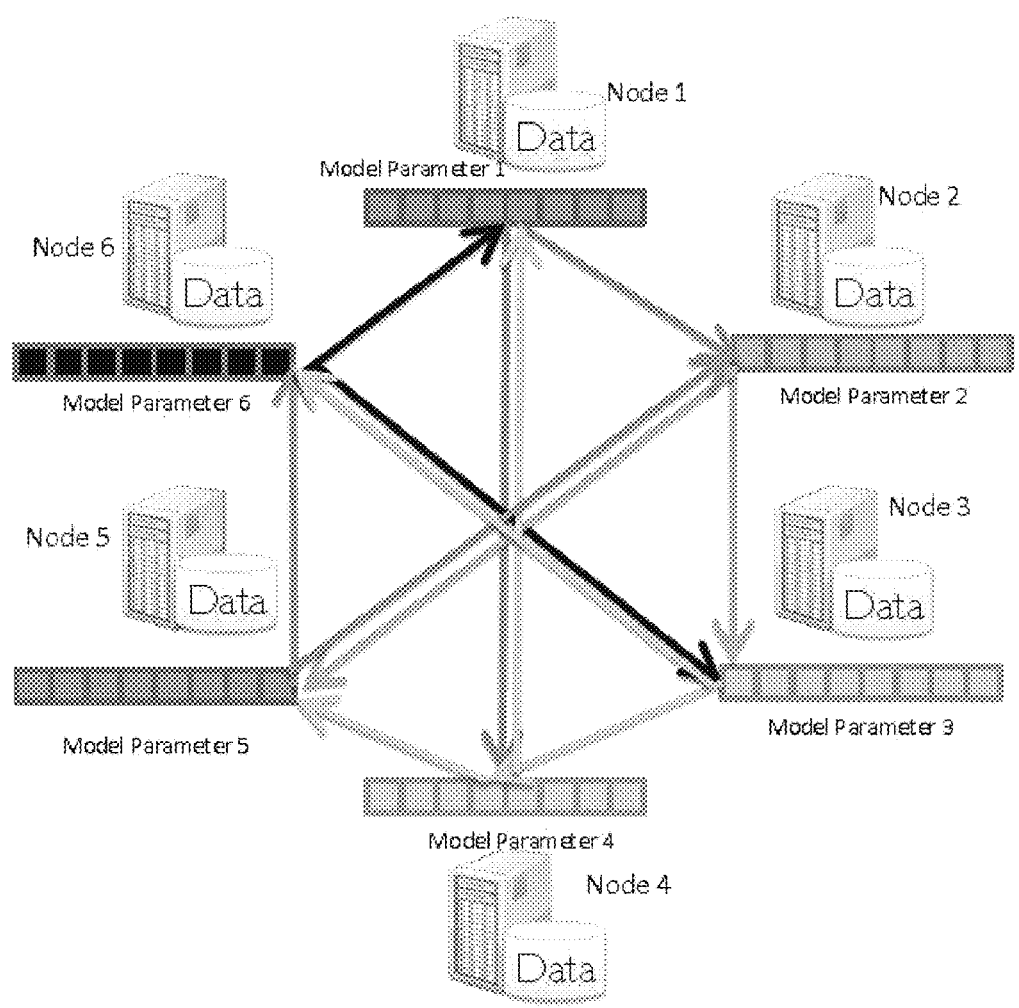
FIG. 3 shows an exemplary Halton-sequence exchange of unit updates (N=6).

FIG. 3 shows an exemplary Halton-sequence exchange of unit updates (N=6). Each ith machine sends updates to log(N) (2 for N=6) network nodes. (to N/2+i and N/4+i). As number of network nodes N increases, the outbound network nodes follows Halton sequence ( N/2, N/4,3N/4, N/8,3N/8 . . . ). All arrows are uni-direction. As number of network nodes(N) grow, total number of updates transmitted increases O(N log N).

MALT's flexible API can unit different training configurations such as the parameter server, mini-batching and peer-to-peer parameter mixing.

When MALT is trained using the peer-to-peer approach, each machine can sends its update to all the other machines to ensure that each unit receives the most recent updates. We refer to this configuration as $MALT_{all}$. As the number of network nodes (N) increases, the gradient communication overhead in $MALT_{all}$ increases $O(N^2)$ times, in a naive all-reduce implementation. Efficient all-reduce primitives such as the butterfly or tree style all-reduce, reduce the communication cost by propagating the unit updates in a tree style. However, this increases the latency by a factor of the height of the tree. Furthermore, if the intermediate network nodes are affected by stragglers or failures, an efficient all-reduce makes recovery complex.

MALT provides an efficient mechanism to propagate unit updates, what we refer to as indirect propagation of unit updates. A developer may use the MALT API to send unit updates to either all N network nodes or fewer network nodes k, ($1 \le k \le N$). MALT facilitates choosing a value k such that a MALT replica (i) disseminates the updates across all the network nodes eventually; (ii) optimizes specific goals of the system such as freshness, and balanced communication/computation ratio in the cluster. By eventually, we mean that over a period of time all the network nodes receive unit updates from every other network node directly or indirectly via an intermediate network node. However, when choosing a value k, less than N, the developer needs to ensure that the communication graph of all network nodes is connected.

Hence, instead of performing an all-reduce, MALT limits the reduce operation to a subset of the connected network nodes. However, naively or randomly selecting what network nodes to send updates to may either leave out certain network nodes from receiving updates from specific network nodes (a partitioned graph of network nodes) or may propagate updates that may be too stale (a weakly connected network node graph). This may adversely affect the convergence in parallel learning units. We now describe how MALT can selectively distribute unit updates to ensure low communication costs and uniform dissemination of unit updates.

MALT provides a pre-existing data flow that sends fewer unit updates and ensures that all the units send/receive unit updates in a uniform fashion. To do so, every network node picks a network node in a uniform fashion to ensure that the updates are distributed across all network nodes. For example, if every network node propagates its updates to k network nodes (k<N), we pick the k network node IDs based on a uniform random sequence such as the Halton sequence that generates successive points that create a k-network node graph with good information dispersal properties. Each network node only sends updates to network nodes and maintain a log(N) sized network node list. This network node list contains the network nodes to send updates to, generated using the Halton sequence. Hence, if we mark the individual network nodes in training cluster as 1, . . . , N, Network node 1 sends its updates to and so on (the Halton sequence with base 2). Hence, in this scheme, the total updates sent in every iteration is only O(N log N). This scheme ensures that the updates are sent uniformly across the range of network nodes. FIGS. 2 and 3 show the all-to-all and Halton communication schemes. In case of a failure, the failed network node is removed, and the send/receive lists are rebuilt.

Using MALT's network-efficient parallel unit training results in faster unit training times. This happens because 1) The amount of data transmitted is reduced. 2) The amount of time to compute the average of gradients is reduced since the gradient is received from fewer network nodes. 3) In a synchronized implementation, this design reduces the number of incoming updates that each network node needs to wait for, before going on to the next iteration. Furthermore, our solution reduces the need for high-bandwidth interfaces, reducing costs and freeing up the network for other applications.

Instead of having each network node communicate with other network nodes, developers can program MALT to communicate with higher (or lower) number of network nodes. The key idea is to balance the communication (sending updates) with computation (computing gradients, applying received gradients). Hence, MALT accepts a data flow graph as an input while creating vectors for the unit parameters. However, the graph of network nodes needs to be connected otherwise the individual unit updates from a network node may not propagate to remaining network nodes, and the units may diverge significantly from one another.

TABLE 1

MALT interface. g.scatter( ) performs one-sided RDMA writes of gradient g to other machines. g.gather( ), a local operation, applies average to the received gradients. g.barrier( ) makes the method synchronous

| MALT API call | Purpose of the call |
|---|---|
| g = createVector(Type) | Creates a globally accessible shared unit parameter or gradient (unit update) vector. Type signifies sparse or dense. |
| g.scatter (Dataflow Graph optional) | Send unit (or just unit updates) to machines as described in graph (default sends to all machines). |
| g.gather (func) | Apply user-defined function func (like average) over unit updates that have arrived (locally) and return a result. |
| g.barrier ( ) | Distributed barrier operation to force synchronization. |
| load_data (f) | Shard and load data from HDFS/NFS from file f. |

The goal of MALT is to provide data-parallelism to any existing machine learning software or method. Given the MALT library and a list of machines, developers launch multiple replicas of their existing software that perform data-parallel learning.

MALT exposes an API as shown in Table 1. This API can be used to create (and port existing) ML applications for data-parallelism. To do so, the developer creates a parameter or a gradient object using MALT API. The dense object is stored as a float array and the sparse object is stored as key-value pairs.

Table 1 shows a serial SGD method (Method 1) and a parallel SGD written using MALT (Method 2). In the serial method, the training method goes over entire data and for each training sample, it calculates the associated gradient value. It then updates the unit parameters, based on this gradient value.

In order to perform this training in a data-parallel fashion, this method can be re-written using MALT API (as shown in Method 2). The programmer specifies the representation (sparse vs dense) and the data flow (ALL—which represents all machines communicate unit updates to one-another, HALTON—which represents the network efficient API from previous section or the developer may specify an arbitrary graph—that represents the data flow graph). When a job is launched using MALT, it runs this code on each machine. Each machine creates a gradient vector object using the MALT API, with the required representation properties (sparse vs dense), and creates communication queues with other machines based on the data flow specified, and creates receiving queues for incoming gradients.

The pseudo-code for a data-parallel machine learning using MALT is discussed next. The serial code of Method 1 is converted to data-parallel using MALT. All machines run the above code (in Method 2). Instead of average, user may specify a function to combine incoming gradients/parameters. Optionally, g.barrier( ) may be used to run the method in a synchronous fashion.

TABLE 1

Procedure 1 Serial SGD

| | |
|---|---|
| 1: | procedure SERIALSGD |
| 2: | Gradient g; |
| 3: | Parameter w; |
| 4: | for epoch = 1 : maxEpochs do |
| 5: | for i = 1 : maxData do |
| 6: | g = cal_gradient(data[i]); |
| 7: | w = w + g; |
| 8: | return w |

Procedure 2 Data-Parallel SGD with MALT

| | |
|---|---|
| 1: | procedure PARALLELSGD |
| 2: | maltGradient g(SPARSE, ALL); |
| 3: | Parameter w; |
| 4: | for epoch = 1 : maxEpochs do |
| 5: | for i = 1 : maxData/totalMachines do |
| 6: | g = cal_gradient(data[i]); |
| 7: | g.scatter(ALL); |
| 8: | g.gather(AVG); |
| 9: | w = w + g; |
| 10: | return w |

Each machine trains over a subset of training data and computes the gradient value for each example. After training over each example (or bunch of examples), this gradient value is sent using the one-sided RDMA operation. The method then computes an average of the received gradients using the gather function. Instead of an average, one can specify a user-defined function (UDF) to compute the resulting gradient from all incoming gradients. This is useful for methods where a simple averaging may not work, such as SVM may require an additional re-scaling function apart from performing an average over the incoming parameters. The training finishes when all machines in the cluster finish training over local examples. The final parameter value w is identical across all machines in the synchronous, all-all case. In other cases, w may differ slightly across machines but is within an acceptable loss value. In such cases, the parameters from any machines may be used as the final unit or an additional reduce can be performed over to obtain final parameter values.

For more complex methods, such as neural networks, which require synchronizing parameters at every layer of neural network, each layer of parameters is represented using a separate maltGradient and can have its own data flow, representation and synchronous/asynchronous behavior.

Finally, it may be difficult to use the maltGradient allocation for certain legacy applications that use their own data structures for parameters or gradients. For such opaque representations, where MALT cannot perform optimizations such as sparseness, developers directly use dstorm. dstorm provides low-level shared memory access with scatter and gather operations, allows managing the data flow and controlling the synchronization. Furthermore, the opaque data structures need to provide a serialization/de-serialization methods to copy in/out from dstorm. Developers can also implement unit-parallelism by carefully sharding their unit parameters over multiple dstorm objects.

We use the MALT API to make the following methods data-parallel. Currently, MALT allows programmers to extend or write programs in C++ and Lua.

We explore distributed stochastic gradient descent methods over linear and convex problems using Support Vector Machines (SVM). We use Leon Bottou's SVM-SGD. Each machine calculates the partial gradient and sends it to other machines. Each machine averages the received gradients and updates its unit weight vector (w) locally.

Matrix factorization involves partitioning a large matrix into its two smaller matrices. This is useful for data composed of two sets of objects, and their interactions need to be quantified. As an example, movie rating data contains interactions between users and movies. By understanding their interactions and calculating the underlying features for every user, one can determine how a user may rate an unseen movie. To scale better, large-scale matrix factorization is not exact, and methods approximate the factorizations. SGD gives good performance for matrix factorizations on a single machine, and we perform matrix factorization using SGD across multiple machines. We implement Hogwild and extend it from a multi-core implementation to a multi-network node using MALT. With Hogwild, the gather function is a replace operation that overwrites parameters.

We train neural networks for text learning. The computation in a neural network occurs over multiple layers forming a network. The training happens in forward and backward passes. In the forward pass, the input samples are processed at each layer and fed forward into the network, finally returning a predicted result at the end of the network. The difference in the ground truth and this predicted result is used in the back propagation phase to update unit weights using the gradient descent method. Parallel training over neural networks is more difficult than SVM for two reasons. First, a data-parallel neural network requires synchronizing parameters for every layer. Second, finding the unit weights for neural networks is a non-convex problem. Hence, just sending the gradients is not sufficient as the parallel unit replicas maybe stuck in different local minimas. Hence, gradient synchronization needs to be interleaved with whole unit synchronization. We use RAPID, and extend its neural-network library with MALT. RAPID is similar in architecture to Torch, and provides a C++ library with Lua front-end for scripting. MALT exports its calls with Lua bindings and integrates with RAPID.

MALT is implemented as a library, and is provided as a package to SVM-SGD, Hogwild and RAPID, allowing developers to use and extend MALT. dstorm is implemented over GASPI, that allows programming shared memory over infiniBand. GASPI exposes shared memory segments and supports one-sided RDMA operations. dstorm implements object creation, scatter, gather and other operations. dstorm hides all GASPI memory management from the user and provides APIs for object creation, scatter/gather and dataflow. GASPI is similar to MPI, and MALT can be implemented over MPI. However, GASPI has superior performance to certain MPI implementations.

We implement the vector object library over dstorm that provides vector abstractions, and provides other APIs for loading data, sparse and dense representations. Overall, MALT library is only 2366 LOC. To integrate with Lua, we have written Lua bindings (in Lua and C++) consisting of 1722 LOC.

In summary, existing map-reduce frameworks are optimized for batch processing systems and ill-suited for tasks that are iterative, fine-grained and asynchronous. Recent scalable ML platforms force developers to learn a new programming environment and rewrite their ML software. The goal of MALT is to efficiently provide data-parallelism to existing ML software. Given a list of machines and MALT library, we demonstrate that one can program ML methods, control the data-flow and synchrony. We provide MALT library interface for procedural (C++) and scripting (Lua) languages and demonstrate data-parallel benefits with SVM, matrix factorization, and neural networks. MALT uses one-sided RDMA primitives that reduce network processing costs and transmission overhead. The new generation of RDMA protocols provides additional opportunities for optimizations. Primitives such as fetch_and_add can be used to perform gradient averaging in hardware and further decrease the unit training costs in software.

Although the techniques have been described in language specific to structural features and/or methodological acts, it is to be understood that the appended claims are not necessarily limited to the features or acts described. Rather, the features and acts are described as example implementations of such techniques.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or part by specialized computer hardware, such as FPGAs, ASICs, etc.

Conditional language such as, among others, "can," "could," "might" or "may," unless specifically stated otherwise, are used to indicate that certain embodiments include, while other embodiments do not include, the noted features, elements and/or steps. Thus, unless otherwise stated, such conditional language is not intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y or Z," unless specifically stated otherwise, is to be understood to present that an item, term, etc. may be either X, or Y, or Z, or a combination thereof.

Many variations and modifications may be made to the above-described embodiments, the elements of which are to be understood as being among other acceptable examples. All such modifications and variations are intended to be included herein within the scope of this disclosure.

What is claimed is:

1. A method for providing distributed learning over a plurality of parallel machine network nodes, comprising:
   providing a vector object library with vector abstractions to create unit parameters or gradients to be synchronized across the parallel machine network nodes;
   training the parallel machine network nodes in a peer-to-peer fashion and allocating a per-sender receive queue at every machine network node and performing distributed in-memory training;
   training each unit replica and maintaining multiple copies of the unit replica being trained, wherein all unit replicas train, receive unit updates and merge in parallel in a peer-to-peer fashion, wherein each receiving machine network node merges updates at a later point in time without interruption; and propagating and synchronizing unit replica updates as lockless and asynchronous operations using wait-free queues, wherein multiple per-sender queues are combined with remote direct memory access (RDMA) circuit.

2. The method of claim 1, wherein each queue stores received units and wherein each unit merges in a fully asynchronous fashion.

3. The method of claim 1, comprising receiving a unit from another machine into a queue or a buffer.

4. The method of claim 1, comprising using hardware support that directly maps remote memory.

5. The method of claim 1, wherein when parallel unit replicas train their units and send their updates, incoming units are stored in receive queues on every network node.

6. The method of claim 1, wherein at the end of every iteration, each unit processes the incoming units and updates its current unit.

7. The method of claim 1, wherein unit replicas send updates and proceed to a next iteration.

8. The method of claim 1, wherein unit replicas train in parallel and send updates to one another, in a fully asynchronous fashion.

9. The method of claim 1, wherein a receiver network node only looks up the receive queue at the end of an iteration cycle, and performs a merge of all received updates.

10. The method of claim 2, wherein no replicas wait for one-another to merge or receive units.

11. A plurality of learning machine network nodes, comprising:
a processor in communication with a plurality of parallel machine network nodes;
computer readable code for providing a vector object library with vector abstractions to create unit parameters or gradients to be synchronized across the parallel machine network nodes;
computer readable code for allocating a per-sender receive queue at every machine network node and performing distributed in-memory training; and
computer readable code for training a unit replica and maintaining multiple copies of the unit replica being trained, wherein all unit replicas train, receive unit updates and merge in parallel in a peer-to-peer fashion, wherein each receiving machine network node merges updates at later point in time without interruption and wherein the propagating and synchronizing unit replica updates are lockless and asynchronous operations using wait-free queues, wherein multiple per-sender queues are combined with remote direct memory access (RDMA) circuit.

12. The network nodes of claim 11, wherein each queue stores received units, and unit merges in a fully asynchronous fashion.

13. The network nodes of claim 11, wherein no replicas wait for one-another to merge or receive units.

14. The network nodes of claim 11, comprising removing a burden of receiving a unit from another machine into a queue or a buffer.

15. The network nodes of claim 11, comprising using hardware support that directly maps remote memory to receive and store an update in a receive queue.

16. The network nodes of claim 11, wherein when parallel unit replicas train their units and send their updates, incoming units are stored in receive queues on every network node.

17. The network nodes of claim 11, wherein at the end of every iteration, each unit processes the incoming units and updates its current unit.

18. The network nodes of claim 11, wherein unit replicas send updates and proceed to a next iteration.

19. The network nodes of claim 11, wherein unit replicas train in parallel and send updates to one another, in a fully asynchronous fashion.

* * * * *